x

US008745982B2

(12) United States Patent
Bordacs et al.

(10) Patent No.: US 8,745,982 B2
(45) Date of Patent: Jun. 10, 2014

(54) METHOD FOR REGENERATING A COMPRESSED AIR SUPPLY DEVICE, CONTROL UNIT AND COMPRESSED AIR SUPPLY DEVICE

(75) Inventors: Zoltán Bordacs, Veszprém (HU); Huba Nemeth, Budapest (HU); Andras Szoboszlay, Pilisborosjenoe (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 950 days.

(21) Appl. No.: 12/868,409

(22) Filed: Aug. 25, 2010

(65) Prior Publication Data

US 2011/0052419 A1    Mar. 3, 2011

(30) Foreign Application Priority Data

Aug. 26, 2009    (DE) .................. 10 2009 038 600

(51) Int. Cl.
    *F15B 21/04*    (2006.01)
(52) U.S. Cl.
    USPC .............................................. 60/409; 60/329
(58) Field of Classification Search
    USPC ................ 60/327, 329, 409; 417/18, 223
    See application file for complete search history.

(56) References Cited

U.S. PATENT DOCUMENTS

| 5,114,315 | A  | * | 5/1992 | Kaltenthaler et al. | ......... | 417/18 |
| 5,639,224 | A  | * | 6/1997 | Schlossarczyk et al. | ...... | 417/298 |
| 6,089,831 | A  | * | 7/2000 | Bruehmann et al. | .......... | 417/282 |
| 6,540,308 | B1 | * | 4/2003 | Hilberer | ....................... | 303/6.01 |
| 7,513,576 | B2 | * | 4/2009 | Hilberer | ....................... | 303/6.01 |
| 2009/0133394 | A1 | | 5/2009 | Fries et al. | | |
| 2010/0065129 | A1 | | 3/2010 | Schnittger et al. | | |

FOREIGN PATENT DOCUMENTS

| DE | 10 2006 023 681 A1 | 11/2007 |
| DE | 10 2007 013 672 A1 | 9/2008 |
| DE | 102007026249 A1 * | 12/2008 |

OTHER PUBLICATIONS

German Office Action dated Apr. 13, 2010, including English translation (eight (8) pages).

* cited by examiner

*Primary Examiner* — Thomas E Lazo
(74) *Attorney, Agent, or Firm* — Crowell & Moring LLP

(57) ABSTRACT

To regenerate a compressed air supply device of a commercial vehicle, a first compressed air circuit is supplied with compressed air until reaches a predetermined target pressure value; then a second compressed air circuit is supplied. Between these steps, the method: (1) regenerates an air dryer when the pressure in the first compressed air circuit has reached the target pressure value, and when a moisture value of the air dryer exceeds a predetermined target moisture value; (2) terminates the regeneration when the pressure has dropped to a predetermined limit pressure value or the moisture value of the air dryer has reached or dropped below the target moisture value; (3) supplies the first compressed air circuit until it has reached the predetermined target pressure value; and (4) repeats the preceding intermediate steps when the moisture value is greater than the target moisture value.

20 Claims, 4 Drawing Sheets

METHOD FOR REGENERATING A COMPRESSED AIR SUPPLY DEVICE, CONTROL UNIT AND COMPRESSED AIR SUPPLY DEVICE

CROSS-REFERENCE TO RELATED APPLICATION

This application claims priority under 35 U.S.C. §119 from German Patent Application No. DE 10 2009 038 600.9, filed Aug. 26, 2009, the entire disclosure of which is herein expressly incorporated by reference.

BACKGROUND AND SUMMARY OF THE INVENTION

The invention relates to a method that is intended for regenerating a compressed air supply device of a commercial vehicle (also known as a utility vehicle) and that supplies a first compressed air circuit with compressed air. The compressed air from the first compressed air circuit is used to regenerate the compressed air supply device. In addition, the present invention relates to a method for regenerating a compressed air supply device of a commercial vehicle, the compressed air supply device being configured so as to supply a first compressed air circuit and a second compressed air circuit. In addition, the present invention relates to an electronic control unit that is intended for a compressed air device of a commercial vehicle and that is configured so as to control one of the methods according to the invention, as well as to a compressed air supply device with such an electronic control unit.

Compressed air supply devices fulfill important tasks in commercial vehicles, for example, in trucks and tractors. There is typically a compressor that draws in the ambient air. However, such ambient air usually contains a relatively high amount of moisture and other deleterious constituents that should not be fed to the compressed air consumers. In order to prevent especially too moist air from being fed to the air consumers, the compressed air supply devices typically have a filter unit with an air dryer for dehumidifying the intake air. The air flows through the air dryer, which is generally provided with an air dryer cartridge that removes the moisture from the air flowing through the air dryer cartridge. Other deleterious constituents can also be filtered out of the air in the filter unit. Then the dried and filtered air is fed to the compressed air consumers, such as the service brake system, a parking brake with spring energy accumulators, an air suspension of the vehicle or compressed air consumers of a trailer.

The more air that is conveyed through the air dryer, the more moisture collects in the air dryer or, more particularly, the air dryer cartridge. However, the air dryer's holding capacity for moisture is limited and eventually reaches a saturation level.

When the saturated moisture level of an air dryer or, more particularly, of an air dryer cartridge has been reached, the air dryer cartridge cannot hold any more moisture, so that the air that continues to flow through the air dryer cartridge is fed in an undried state into the compressed air consumer circuits, a state that can have a negative impact on the functionality of the compressed air consumer systems.

Therefore, compressed air supply devices are regenerated. During a regenerating process the compressed air flow is reversed in the air dryer, for example, by discharging the compressed air from the supply tank of one of the compressed air circuits of the commercial vehicle through the air dryer into the atmosphere. As the air flows through the air dryer into the regenerating device, the air flowing through removes the moisture and any other foreign particles from the filter and the air dryer. Hence, such a regenerating process consumes compressed air and, therefore, results in a drop in pressure in the compressed air reservoir, from which the regenerating compressed air comes.

However, when the air dryer reaches its saturation level, the air that flows through the air dryer for the purpose of supplying the compressed air consumers is not further dehumidified, that is, moist air will be conveyed to the compressed air consumers. If during a regenerating process this moist air is conveyed through the air dryer into the regenerating device, the result is only limited regeneration, because the air dryer cartridge cannot efficiently dry the moist regenerating air. Hence, an air dryer that has reached its saturated moisture level can no longer fulfill not only its task of dehumidifying the supply air, but it can also dry or rather regenerate the supply air only with difficulty and very slowly.

In modern commercial vehicles the compressed air reservoir of the various compressed air consumer circuits is often filled before driving off. In this case the conventional practice is to regenerate once the compressed air supply device, when the service brake system of a commercial vehicle is raised to maximum pressure. In so doing, the compressed air from the service brake system is used that is thereafter raised to the maximum pressure again. The maximum filling pressure of a service brake system of a commercial vehicle is typically 12.5 bar. The regeneration process is usually carried out until there is a predetermined pressure loss in the service brake system, so that the pressure in this system is decreased, for example, to 11 or 10 bar.

However, it can happen in commercial vehicles with a very high compressed air consumption that despite the conventional regeneration processes the air dryer reaches a very high moisture level or even a saturated moisture level. For example, commercial vehicles that have a container lifting device, but travel only short distances, such as vehicles for transporting containers at harbor facilities, use pneumatic lifting systems with up to 15 bar. Owing to the frequent lifting and lowering operations, such vehicles have such a high requirement of compressed air flow through the air dryer that a conventional air dryer cartridge quickly reaches the saturation level.

One way of preventing the air dryer in commercial vehicles with a high compressed air consumption from rapidly reaching a saturation level consists of increasing the dehumidifying capacity of the air dryer cartridge. This increase can be achieved, in particular, by increasing the dimensions of the air dryer cartridge. However, the development of larger air dryer cartridges is expensive, because as the size of the throughflow areas for the air stream increases, the forces exerted on the elements of the air dryer cartridge become significantly larger. In addition, the time required for a larger air dryer cartridge for drying increases if it were to be wetted up to the saturation level.

Therefore, there is a need for an improved method and for an improved compressed air supply device that together circumvent the problem of the air dryer reaching a moisture level that is too high and, in particular, of the air dryer reaching a saturated moisture level.

According to this specification, the first compressed air circuit involves, in particular, the compressed air circuit of a service brake. There can also be an additional compressed air circuit of the service brake. In particular, it is possible that the two compressed air circuits of the service brake are filled in parallel. Then in light of this specification the two service brake compressed air circuits can be regarded as the first compressed air circuit. The second compressed air circuit can be, in particular, a compressed air circuit that is allocated to a parking brake system and that also supplies additional compressed air consumers, for example, a trailer, with compressed air. Furthermore, there can also be other compressed air circuits, such as those that serve to supply a consumer with an especially high compressed air consumption. As a rule, when the compressed air consumer circuits are initially filled, such compressed air consumers are filled with compressed air only after the other compressed air circuits, in particular, the compressed air circuits of the service brake system, have been filled. However, the point in time at which such additional compressed air circuits are filled is not specified and can occur as a function of the requirements of the individual case.

A maximum pressure value corresponds to a maximum pressure, up to which a compressed air circuit is to be filled with compressed air. In this case it can be, for example, the maximum pressure intended for a service brake system and is typically 12.5 bar. A minimum set pressure can correspond to a minimum pressure, at which a compressed air circuit is regarded as functional. Due to legal provisions the minimum set pressure value for service brake systems is typically 7.5 bar. For the compressed air circuits allocated to the other compressed air consumer systems, the maximum pressure value and the minimum set pressure value can assume other suitable values. However, a minimum set pressure value does not have to be defined for all of the compressed air circuits.

An air dryer can have an air dryer cartridge that can be replaceable.

The moisture level of the air dryer can be determined by known methods. In particular, it can be provided that the moisture level is determined by a sensor or is calculated from the detected parameters. To this end, one or more suitable sensors and a suitable control unit can be provided. In order to determine the pressure in the compressed air circuits, it is also possible to use suitable sensors. According to this specification, a moisture level is parameterized by a moisture value. Hence, a higher moisture value corresponds to a higher moisture of the air dryer or rather the air dryer cartridge.

The moisture level can be defined as the so-called wetness level that corresponds to a volume of standard air conveyed through the air dryer. For example, a typical air dryer cartridge can have a capacity of 10,000 l of standard air, before it reaches its saturation degree at a wetness level of 10,000 l. An especially large air dryer cartridge can have, for example, a wetness level of 15,000 l, when it reaches its saturation level.

The invention relates to a method for regenerating a compressed air supply device of a commercial vehicle. In this case the compressed air supply device has an air dryer and is capable of supplying a first compressed air circuit, to which a predetermined maximum pressure value is assigned, and a second compressed air circuit with compressed air. According to this method, the first compressed air circuit is supplied with compressed air until the pressure in the first compressed air circuit has reached a predetermined target pressure value.

If at this point a moisture level of the air dryer exceeds a predetermined target moisture level, then the air dryer is regenerated with compressed air from the first compressed air circuit. The regenerating process is terminated, when the pressure in the first compressed air circuit has reached a predetermined limit pressure value or the moisture level of the air dryer has reached the target moisture level. Then the first compressed air circuit is supplied with compressed air until it has reached the target pressure value. If the moisture level of the air dryer is still greater than the target moisture level, then these steps are repeated. Otherwise, the second compressed air circuit is supplied with compressed air. Hence, the second compressed air circuit is not supplied with compressed air until the first compressed air circuit has reached the target pressure value, and the moisture level of the air dryer is at or below the target moisture level. Thus, when the second compressed air circuit is initially supplied with compressed air, the compressed air supply device is at a well-defined level. In particular, a low moisture level of the air dryer is guaranteed.

It can be especially practical for the target pressure value to be the maximum pressure value. Then the first compressed air circuit is filled up to the maximum level, before the filling operation of the second compressed air circuit is started.

A further development of the invention provides that the limit pressure value is greater than a minimum pressure value of the first compressed air circuit. As a consequence, the pressure in the first compressed air circuit never drops to the minimum set pressure value during the regenerating process.

It is especially practical if the target moisture level, or rather the associated target moisture value, corresponds to a dry air dryer. As a result, the air dryer is totally regenerated before the second compressed air circuit is supplied with compressed air. Hence, when the second compressed air circuit is initially supplied with compressed air, the air dryer can hold the largest possible amount of moisture. Consequently the saturation limit cannot be reached very quickly. Of course, it can be provided that during the filling operation of the second compressed air circuit an additional regenerating strategy is pursued. For example, it is contemplated to provide the method described below for the regenerating process.

A preferred embodiment provides that the parameters that are used are adapted during the process. In particular, it is provided that when the process steps are repeated, a modified target pressure value, a modified target moisture value, and/or a modified limit pressure value is (are) used. For example, a parameter can be easily changed by means of an electronic control unit by simply writing, for example, the modified values into a memory unit. This strategy enables a dynamic adjustment of the regenerating process to, for example, the changed environmental conditions or to changes in the compressed air system of the vehicle, for example, when after reaching a specific pressure value in the first compressed air circuit an additional compressed air circuit is to be supplied with compressed air by the compressed air supply device, before the second compressed air circuit is to be filled. Such a parameter change can occur especially in reaction to sensor signals.

Furthermore, it can be provided that the method or method steps are executed while the vehicle is running. In addition, it is self-evident that the legally prescribed pressures, for example, in the service brake, must be reached. As a result, it is possible for the driver to use the commercial vehicle as soon as the necessary conditions for operating the vehicle are filled, and he does not have to wait until the regenerating processes have been completed. This state can be achieved especially if, when the first compressed air circuit is a compressed air circuit of a service brake, the first pressure value is set above the minimum set pressure value prescribed by law for operating a vehicle, for example, at 9 bar. It is practical to set the limit pressure value, for example, at 8 bar, so that on reaching the first pressure value, at which a regenerating process can be carried out, even after a regenerating process that consumes the compressed air, the pressure in the service brake system is above the pressure value prescribed by law for use of the commercial vehicle.

In particular, it can be provided that when the compressed air circuits of the commercial vehicle are initially filled, the method is started or executed before the commercial vehicle is employed or rather upon startup of the commercial vehicle. In the event of such an initial filling operation, large amounts of compressed air are typically fed to the consumer circuits, and the air dryer is loaded correspondingly. If, however, the described method is used, then the moisture level of the air dryer remains low.

Furthermore, the invention provides a method for regenerating a compressed air supply device of a commercial vehicle. The compressed air supply device has an air dryer. According to the method, a first compressed air circuit of the commercial vehicle is supplied with compressed air. In this case the first compressed air circuit is fed a predetermined maximum pressure value. It is expedient that the first compressed air circuit can be a service brake system of the commercial vehicle.

However, it is also contemplated that the first compressed air circuit is allocated to another compressed air consumer system. If the pressure in the first compressed air circuit exhibits a predetermined first pressure value, and there is at least one predetermined first moisture level of the air dryer, then a regeneration of the air dryer is carried out with the compressed air from the first compressed air circuit. The regenerating process is terminated, when the first compressed air circuit exhibits a predetermined second pressure value that is below the first pressure value, or when there is a predetermined second moisture level of the air dryer. If at the end of the regenerating process the pressure in the first compressed air circuit is less than a target pressure value, then these steps are repeated. The first pressure value is less than the target pressure value, up to which the first compressed air circuit is supposed to be filled with compressed air. The second moisture level is below the first moisture level. This method allows a kind of intermediate regeneration to be carried out, before the target pressure value in the first compressed air circuit is reached. As a result, while filling the first compressed air circuit to the target pressure value, a regenerating process is generally executed, when there is adequate pressure in the first compressed air circuit, and a first moisture level of the air dryer is reached or exceeded. In contrast to the prior art, this strategy enables an early and frequent regeneration, as a result of which the moisture in the air dryer is held at a low level. The result is that, on the one hand, the moisture in the air dryer is prevented from reaching the saturation level. On the other hand, the moisture level is held generally low, thus raising the efficiency of the air dryer during normal operations.

In particular, it can be provided that when the compressed air circuits of the commercial vehicle are initially filled, the method is started or executed before the commercial vehicle is employed or rather upon startup of the commercial vehicle. In the event of such an initial filling operation, large amounts of compressed air are typically fed to the consumer circuits, and the air dryer is loaded correspondingly. If, however, the described method is used, then the moisture level of the air dryer remains low.

It is practical for the second pressure value to exceed a minimum set pressure value of the first compressed air circuit, so that the pressure in the first compressed air circuit is always above this minimum set pressure value. In this way the first compressed air circuit can also be used during the described method. This applies especially to the case of a service brake, where solely for reasons relating to the law the service brake system must exhibit a minimum pressure, so that the vehicle may be put into motion.

It is advantageous if the first moisture value and the second moisture value are below a saturated moisture value of the air dryer. Hence, the regenerating process is carried out, before the saturated moisture level in the air dryer is reached. The moisture level in the air dryer cartridge moves, according to the invention, between the first and the second moisture level and, hence, lies in a well-defined range. As a result, it is possible to set a moisture level in the air dryer that is efficient for operating the compressed air supply device. In this respect it can be especially advantageous if the first moisture value amounts to one-third the saturated moisture value or less in order to operate the air dryer with very little moisture.

In one advantageous embodiment a modified first pressure value and/or a modified second pressure value is (are) used between the regenerating operations or rather during an iterative process. It is also contemplated that a modified first moisture value and/or a modified second moisture value is (are) used. Hence, the parameters that are used are adapted during the process. A parameter change can be easily made, for example, by means of an electronic control unit in that the modified values are written, for example, into a memory unit. This strategy enables a dynamic adjustment of the regenerating process to, for example, the changed environmental conditions or to changes in the compressed air system of the vehicle, for example, when after reaching a specific pressure value in the first compressed air circuit an additional compressed air circuit is to be supplied with compressed air by the compressed air supply device. Such a parameter change can occur especially in reaction to sensor signals.

The invention can be further developed to the effect that the method or rather the steps of the method are executed while the vehicle is running. In addition, it is self-evident that the legally prescribed pressures, for example, in the service brake, must be reached. As a result, it is possible for the driver to use the commercial vehicle as soon as the necessary conditions for operating the vehicle are filled, and he does not have to wait until the regenerating processes have been completed. This state can be achieved especially if, when the first compressed air circuit is a compressed air circuit of a service brake, the first pressure value is set above the minimum set pressure value prescribed by law for operating a vehicle, for example, at 9 bar. It is practical to set the second pressure value, for example, at 8 bar, so that on reaching the first pressure value, at which a regenerating process can be carried out, even after a regenerating process that consumes the compressed air, the pressure in the service brake system is above the pressure prescribed by law for use of the commercial vehicle.

An especially preferred embodiment can provide that, furthermore, the compressed air supply device is capable of supplying a second compressed air circuit with compressed air. After the target pressure value in the first compressed air circuit has been reached, this embodiment provides that when the moisture level of the air dryer exceeds a predetermined target moisture level, then the air dryer is regenerated with compressed air from the first compressed air circuit. The regenerating process is terminated when the pressure in the first compressed air circuit has reached a predetermined limit pressure value, or the moisture level of the air dryer has reached the target moisture level. Then the first compressed air circuit is filled with compressed air until the pressure in the first compressed air circuit corresponds to the target set pressure. If at this point the moisture level of the air dryer is greater than the target moisture level, then the regeneration process is carried out again under the said conditions. If, however, the first compressed air circuit exhibits a pressure that corresponds to the target pressure value and if the moisture level of the air dryer is less than or equal to the target moisture level, then the second compressed air circuit is supplied with compressed air. Hence, a first compressed air circuit is supplied with compressed air, holding the moisture level in the air dryer low during the supplying process through the use of regenerating processes. If the first compressed air circuit is filled to a specific target pressure value, then the regenerating processes and supply processes are executed alternatingly. Not until there is both a target moisture level and a target pressure value is a second compressed air circuit supplied with compressed air. The result is that the second compressed air circuit is supplied with compressed air under precisely defined conditions regarding the moisture of the air dryer and the pressure level in the first compressed air circuit. In particular, filling the first compressed air circuit with compressed air can be achieved with a functional air dryer. Furthermore, it can be prevented that the air dryer quickly reaches a saturation level. This feature may be especially important when the first compressed air circuit is a part of the service brake system, and the second compressed air circuit is provided, among other things, for the parking brake system and, for example, the compressed air consumers of a trailer. It is also achieved that use of the vehicle can begin with an air dryer at a low moisture level, so that even in the event of a high compressed air consumption during use the saturation level is not reached.

It can be especially practical that the target pressure value is the maximum pressure value. Then the first compressed air circuit is filled up to the maximum level, before the filling operation of the second compressed air circuit is started.

Furthermore, it is advantageous that the limit pressure value is greater than a minimum pressure value of the first compressed air circuit. As a consequence, the pressure in the first compressed air circuit never drops to the minimum set pressure value during the regenerating process.

Furthermore, the invention provides an electronic control unit that is intended for controlling a compressed air supply device of a commercial vehicle and that is configured so as to control one of the methods described above.

In addition, the invention relates to a compressed air supply device that is intended for a commercial vehicle and includes an electronic control unit that is configured so as to control one of the methods described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
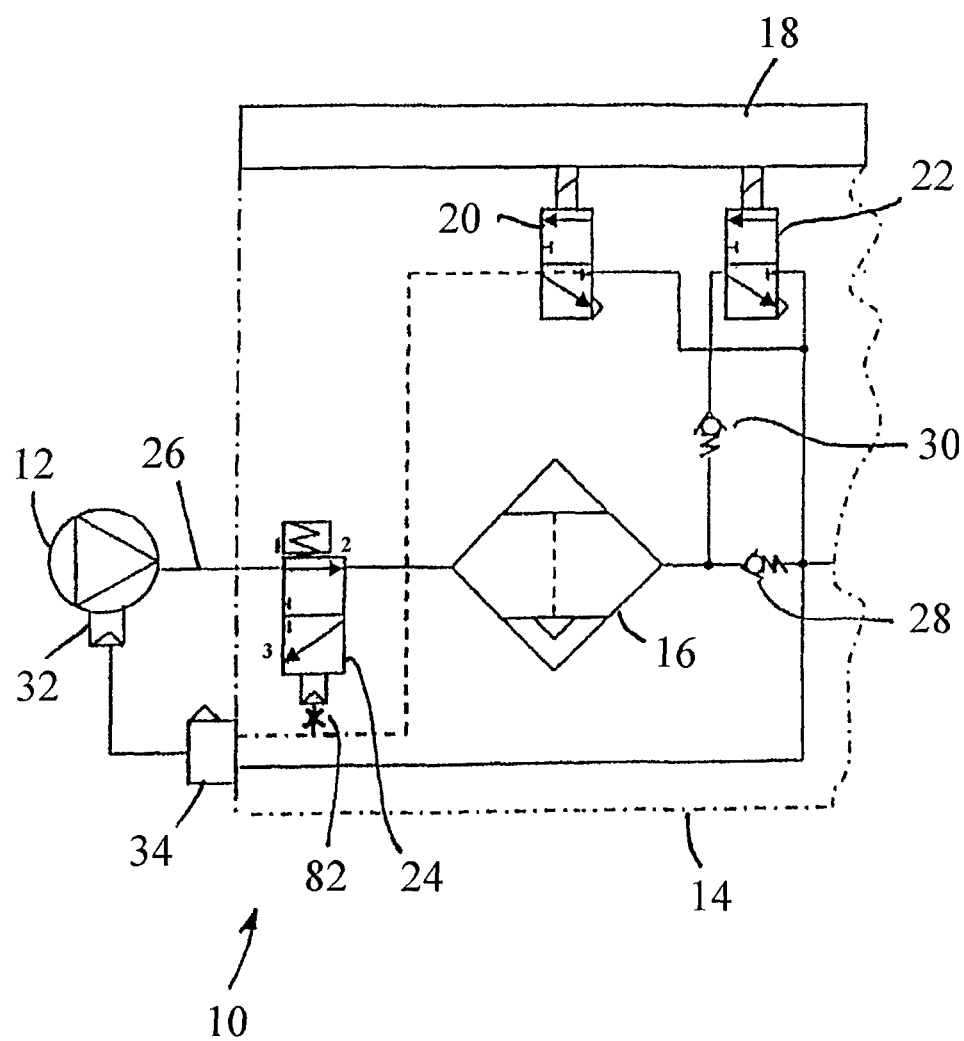
FIG. 1 is a schematic drawing of a part of a compressed air supply device.

FIG. 1 is a schematic drawing of a part of a compressed air supply device that is capable of a regenerating process. According to the invention, it is also possible to conceive of compressed air supply devices that are designed in other ways. In principle, the invention can be implemented with any kind of regenerable compressed air supply device that has a suitably configured control unit for controlling the regenerating process.

The exemplary compressed air supply device 10 includes a compressor 12 and an air treatment system 14. This air treatment system 14 is generally combined with a multi-circuit safety valve (not illustrated), or it is upstream of this multi-circuit safety valve. Furthermore, a conventional air treatment system has a pressure regulator (not illustrated). Compressed air circuits of compressed air consumers, like the service brakes to be supplied with compressed air, are connected to the compressed air supply device 10 in a manner that is known from the prior art and for this reason it is not illustrated herein. In addition, a filter unit 16 is connected to these additional components (not illustrated) by way of a non-return valve 28. The filter unit 16 has an air dryer, which is not illustrated in detail and has an air dryer cartridge.

Another component of the air treatment device 14 is an electronic control unit 18 (also called an ECU=electronic control unit). This electronic control unit 18 serves, among other things, to actuate a first solenoid valve 20 and a second solenoid valve 22. The second solenoid valve 22 is arranged in a flow path that bypasses the non-return valve 28. This flow path contains another non-return valve 30, which allows flow from the second solenoid valve 22 to the filter unit 16 and suppresses a reverse flow. Furthermore, a pneumatically driven 3/2 way valve 24 is disposed in a feed line 26 between the compressor 12 and the filter unit 16. The compressor is coupled with a relay valve 34 by way of a pneumatic input 32 for actuating an energy saving unit. The operating mode of this relay valve will be explained in detail below in conjunction with the following description of the processes connected with the regeneration of the filter unit 16 and the open circuit of the compressor 12.

If a regeneration of the filter unit 16 is required, then the solenoid valve 22 is opened. In essence the solenoid valve 20 is opened at the same time. This process can be controlled by the control unit 18. The opening of the solenoid valve 20 results, on the one hand, in a switch-over of the 3/2 way valve 24 and, on the other hand, in the loading of the pneumatic control input 32 of the compressor 12 with compressed air. The latter action is brought about by actuating the relay valve 34 that draws compressed air from the service brake tanks (not illustrated) and thus passes through the control input 32 the system pressure for driving the compressor 12. The result of the switch-over of the 3/2 way valve 24 is that the compressed air can drain off towards the outlet 3 via the solenoid valve 22 and the filter unit 16. Another consequence of switching over the 3/2 way valve 24 is that the line 26 between the compressor 12 and the filter unit 16 is blocked. A choke 82 serves to delay the switch-over of the 3/2 way valve.

Consequently, the compressed air that is stored in the line segment between the compressor 12 and the 3/2 way valve 24 is not lost during the regeneration process. Since the line 26 is shut off simultaneously with the regeneration process, the dynamic pressure at the outlet 3 is kept low, for example, at approximately 0.2 bar, whereas when the line 26 is not shut off, the dynamic pressure may be approximately 1.5 bar.

However, it is also possible to drive the solenoid valve 20 without driving in essence simultaneously the solenoid valve 22. This strategy is logical, if the pumping capacity of the compressor 12 is not required, but a regeneration is not necessary. In order to terminate the regenerating process, the solenoid valves 20 and 22 are closed again through the control action of the control unit 18, and the original state of the compressed air supply device is restored.

Figure 2:
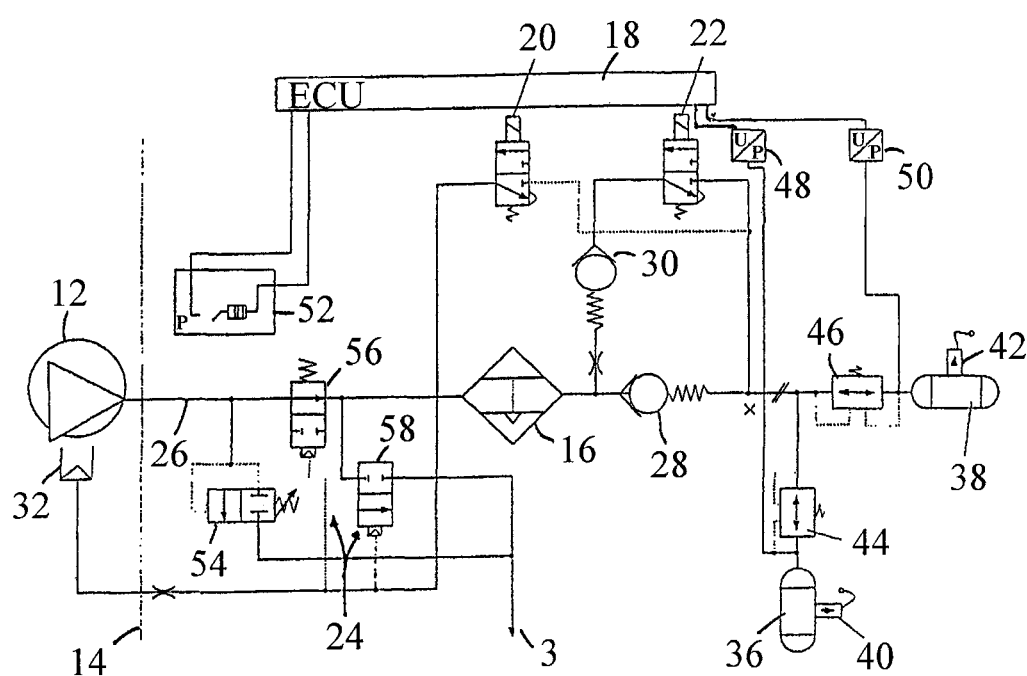
FIG. 2 is a schematic drawing of a part of an alternative compressed air supply device.

FIG. 2 is a schematic drawing of a part of an additional compressed air supply device. In addition to the components depicted in FIG. 1, the compressed air tanks 36, 38 with automatic discharging valves 40, 42 and the overflow valves 44, 46, assigned to these compressed air tanks 36, 38, are shown. The compressed air tanks 36, 38 and the respective components are assigned, for example, to the service brake circuits. Furthermore, there are pressure sensors 48, 50 that measure the pressure in the compressed air tanks 36, 38 and send corresponding signals to the electronic control unit 18. Furthermore, a heating unit 52 is shown. A safety valve 54, which can pass the overpressure to the outlet 3, is connected to the line 26 between the compressor 12 and the filter unit 16. In the present case the valve unit 24 consists of two 2/2 way valves 56, 58. These 2/2 way valves 56, 58 fulfill the same task as the 3/2 way valve 24 from FIG. 1. They are driven jointly when the solenoid valve 20 is switched over, so that they occupy their position (not depicted in FIG. 2). Consequently the line 26 between the compressor 12 and the filter unit 16 is interrupted, whereas the path for the regenerating air through the 2/2 way valve 58 to the outlet 3 is released. It is not necessary that each compressed air tank 36, 38 be assigned its own dedicated pressure sensor.

In general, it is possible to connect, besides the two compressed air circuits for the service brake, even more compressed air circuits (not illustrated) to a compressed air supply device 10. This applies independently of the specific embodiment of the compressed air supply device. In particular, a parking brake can be provided with a compressed air circuit, which can also supply any existing trailer or other consumers with compressed air. An air suspension can also be provided.

Furthermore, a compressed air circuit of a compressed air consumer with an especially high compressed air consumption can be connected to the compressed air supply device 10, for example, a pneumatic lifting device for containers. Such a lifting device is often loaded with pressure up to 15 bar and consumes a considerable amount of compressed air during the lifting process. This compressed air is fed to the compressed air circuit via the filter unit 16 with the air dryer. Another example of a consumer with a high compressed air requirement is a system for filling tires with compressed air.

Each compressed air circuit is assigned a maximum pressure Pmax, up to which the compressed air circuit is to be maximally filled. For a compressed air circuit of the service brake this maximum pressure Pmax is typically 12.5 bar, for other compressed air circuits other values for the maximum pressure may apply. A compressed air circuit of the service brake is also assigned a minimum set pressure value Pmin, which it must exhibit at a minimum, so that the service brake can be used. This minimum set pressure value Pmin is typically 7.5 bar. The compressed air circuits of other consumers may also be assigned minimum set pressure values, but this does not have to be the case.

Figure 3:
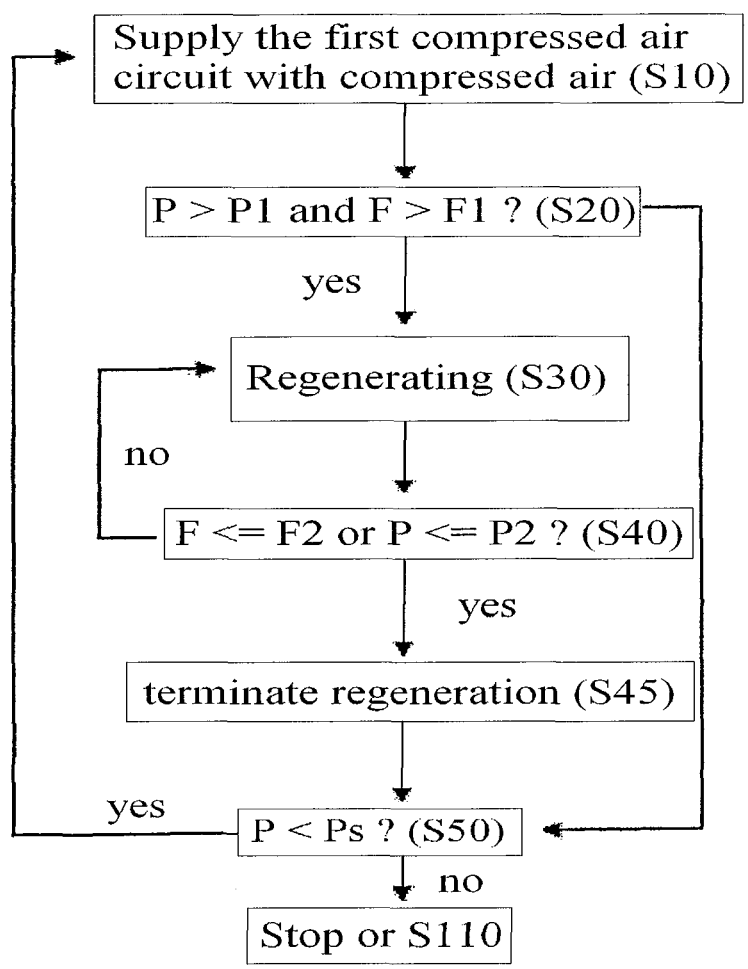
FIG. 3 shows a flowchart of a method for regenerating a compressed air supply device.
Figure 4:
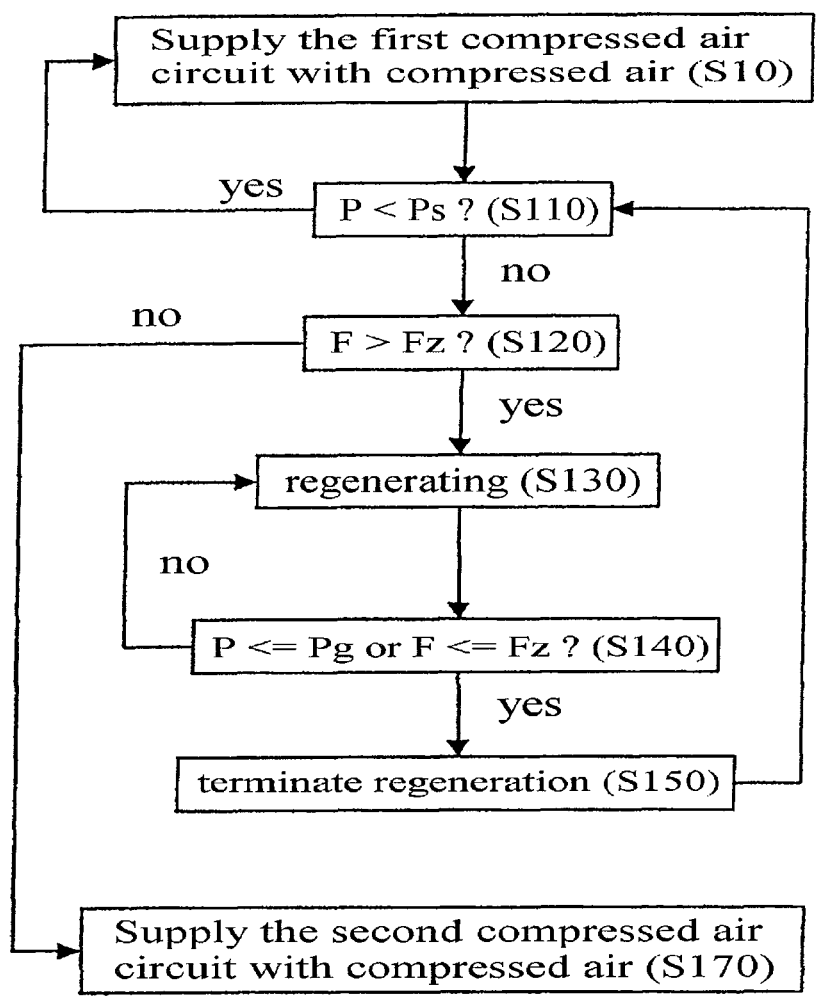
FIG. 4 shows a flowchart of an additional method for regenerating a compressed air supply device.

FIGS. 3 and 4 show methods for regenerating a compressed air supply device. These methods can be carried out, for example, with one of the compressed air supply devices described above and are controlled expediently by a control unit.

According to the method depicted in FIG. 3, a first compressed air circuit is filled with compressed air in step S10. This first compressed air circuit may preferably be a compressed air circuit that is a part of the service brake system. In the context of this description the first compressed air circuit may also comprise the two compressed air circuits that are typically on hand in the service brake and that are usually supplied in parallel with compressed air.

Step S20 checks whether the pressure P in the first compressed air circuit exceeds a first pressure value P1, and whether the moisture value F exceeds a first moisture value F1, that is, whether the moisture of the air dryer exceeds a predetermined level. These checking operations can be carried out by a control unit 18 on the basis of data of suitable sensors.

If this is the case, then the conditions for a regeneration process are fulfilled, and the regeneration process is started in step S30. Step S40 checks whether owing to the regeneration the moisture value F has reached a predetermined second moisture value F2 (F2<F1 applies), or whether the pressure P in the first compressed air circuit has dropped to or below a second pressure value P2 that is less than the first pressure value P1 (P2<P1 applies). If neither situation is the case, the regeneration process is continued in step S30.

Otherwise step S45 terminates the regeneration process, and the routine jumps to step S50, which checks whether the pressure P is below a target pressure value Ps. The routine also branches off from step S20 to step S50 if the conditions for a regeneration process are not fulfilled. If the first compressed air circuit has not yet reached the target pressure value, then the routine branches back from step S50 to step S10. If the target pressure value Ps has been reached, then the process is terminated. That is, at this point a kind of "intermediate regeneration" is carried out, during which on filling the first compressed air circuit prior to reaching the target pressure value Ps the regeneration process is carried out in order to hold the moisture level at a low level. Optionally the method that is shown in FIG. 4 can now be carried out.

FIG. 4 shows an additional method. In step S100 the first compressed air circuit is supplied with compressed air. This process can be implemented, for example, with a method shown in FIG. 3 and described above.

Step S110 checks whether the pressure P in the supplied compressed air circuit corresponds to a target pressure value Ps. If this is not the case, then the routine continues at step S10, and the compressed air circuit is provided with more compressed air. If the target pressure value Ps is reached, then step S120 checks whether the moisture value F of the air dryer, or more particularly the air dryer cartridge, exceeds a predetermined target moisture value Fz. If this is not the case, that is, there is both a desired pressure Ps in the first compressed air circuit and a desired low moisture level in the air dryer, then step S170 is initiated by supplying the second compressed air circuit with compressed air. This supplying process can be carried out with conventional methods.

Otherwise, step S130 starts the regeneration of the compressed air supply device. Step S140 checks whether the pressure P in the first compressed air circuit has dropped to or below a limit pressure value Pg (for which Pg<Ps applies) or whether the moisture value F of the air dryer has reached the target moisture value Fz. If one of the two is the case, then the regeneration in step S150 is terminated and the routine continues with step S110. Otherwise the regeneration process in step S130 is continued.

Even in the case of this method the process can be controlled by a control unit that communicates with suitable sensors, in order to execute the necessary check steps.

It is especially practical to carry out the methods, shown in FIGS. 3 and 4, at the startup of a commercial vehicle, when the compressed air circuits are initially filled. During such an initial filling process, the amount of air flowing through the air dryer is especially large because as a rule all of the compressed air tanks assigned to the compressed air circuits have to be filled with compressed air.

It is especially advantageous to carry out the method, shown in FIG. 4 according to the method, shown in FIG. 3. Such a combination of the methods makes it possible to maintain a low moisture level while filling the first compressed air circuit, and the filling of the second compressed air circuit is not initiated until after the first compressed air circuit has reached its set pressure, and the moisture in the air dryer is at a low level. Hence, after the first and the second compressed air circuits have been filled, the overall result is a low moisture level in the air dryer, thus creating good conditions for the case that even owing to high compressed air consumption while operating, for example, a lifting device, the saturation level of the air dryer will not be reached.

It is usually expedient to select the target pressure value Ps as the maximum pressure value Pmax of the first compressed air circuit. The target pressure value Ps can also be less than the maximum pressure value Pmax. The first pressure value P1, the second pressure value P2 and the limit pressure value Pg should be less than the target pressure value Ps. If the compressed air circuit, for example, in the case of a compressed air circuit of a service brake, exhibits a minimum set pressure value Pmin, then the first pressure value P1, the second pressure value P2 and the limit pressure value Pg should be between Pmin and Pmax or between Pmin and Ps respectively. If the first compressed air circuit is assigned to the service brake, then it is expedient to select the pressure values P1=9 bar, P2=8 bar, Ps=12.5 bar. Pg is set expediently to Pg=11 bar, in order to prevent too much moisture from collecting in the air dryer during the refilling operation required after the regeneration process. If both methods are carried out one after the other, Pg can also be at P2 (Pg=P2).

Furthermore, it is advantageous for the moisture values F1, F2 and Fz to be below a moisture value that corresponds to a saturation of the air dryer. In particular, it can be advantageous for the target moisture value Fz to be set at zero, that is, corresponds to a totally dried or dry air filter. Then the regeneration process, shown in FIG. 4, is repeated until the air dryer is totally regenerated. Hence, the supplying operation of the second compressed air circuit is executed with an air dryer that is totally dry at the start.

The methods described herein can provide that the various parameters, like Fz, P1, P2, Ps and Pg are changed and adapted during the process of carrying out the method so that the method can be adapted to the modified conditions. It may also be practical to allow for certain suitable deviations while checking whether the checked parameters fulfill the aforementioned conditions. For example, it may be practical, despite a slight overshooting of the target moisture value Fz in an iteration of step S120, to branch off to step S170 when the first compressed air circuit is totally filled, so that the process, shown in FIG. 4, is not caught in an endless loop, in which an additional small amount of regeneration requires just so much compressed air that the required refilling leads again to an overshooting of the target moisture value Fz. In such a case the alternative is to regard the criteria for the target pressure value as "soft".

The described methods can be carried out in addition to other regeneration methods that are already known from the prior art. Furthermore, additional steps for supplying the compressed air circuits with compressed air can also be executed. In particular, it can be provided that one or more additional compressed air circuits can be filled between the filling of the first compressed air circuit with compressed air and the regeneration of the air dryer to the target moisture value. Thus, it is contemplated that after or during the filling operation of the compressed air circuits of the service brake, for example, an air suspension or other compressed air consumers are supplied with compressed air, before the regeneration to the target moisture value is carried out, and the second compressed air circuit (in this case preferably a compressed air circuit of the parking brake) is supplied with compressed air.

TABLE OF REFERENCE NUMERALS 1 connection
2 connection
3 outlet
10 compressed air supply system
12 compressor
14 air treatment system
16 filter unit
18 electronic control unit
20 first solenoid valve
22 second solenoid valve
24 valve unit
26 feed line
28 non-return valve
30 non-return valve
32 control input
34 relay valve
36 compressed air tank
38 compressed air tank
40 discharging valve
42 discharging valve
44 overflow valve
46 overflow valve
48 pressure sensor
50 pressure sensor
52 heating unit
54 safety valve
56 2/2 way valve
58 2/2 way valve
82 choke The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regenerating a compressed air supply device of a commercial vehicle, wherein the compressed air supply device has an air dryer and is capable of supplying a first compressed air circuit and a second compressed air circuit with compressed air, wherein the first compressed air circuit is assigned a predetermined maximum pressure value, the method comprising the acts of:
   supplying the first compressed air circuit with compressed air until the pressure in the first compressed air circuit has reached a predetermined target pressure value;
   subsequently supplying the second compressed air circuit with compressed air;
   wherein between the supplying of the first compressed air circuit and the subsequent supplying of the second compressed air circuit, the method further comprises the acts of:
   (a) regenerating the air dryer with compressed air from the first compressed air circuit, when the pressure in the first compressed air circuit has reached the target pressure value, and when a moisture value of the air dryer exceeds a predetermined target moisture value;
   (b) terminating the regeneration, when the pressure in the first compressed air circuit has dropped to a predetermined limit pressure value, or the moisture value of the air dryer has reached or dropped below the target moisture value;
   (c) supplying the first compressed air circuit with compressed air until the first compressed air circuit has reached the predetermined target pressure value;
   repeating steps (a)-(c) when the moisture value of the air dryer is greater than the target moisture value.

2. The method according to claim 1, wherein the target pressure value is the maximum pressure value.

3. The method according to claim 1, wherein the limit pressure value is greater than a predetermined minimum set pressure value of the first compressed air circuit.

4. The method according to claim 1, wherein the target moisture value corresponds to a dry air dryer.

5. The method according to claim 1, wherein at least one of a modified target pressure value, a modified target moisture value, and a modified limit pressure value is used during an iterative process.

6. The method according to claim 1, wherein the method is carried out while the commercial vehicle is running.

7. The method according to claim 1, wherein the method is carried out while filling the compressed air circuit on startup of the commercial vehicle.

8. An electronic control unit for controlling a compressed air supply device of a commercial vehicle, wherein the electronic control unit comprises a non-transitory computer readable medium having stored therein program segments that:
supply the first compressed air circuit with compressed air until the pressure in the first compressed air circuit has reached a predetermined target pressure value;
subsequently supply the second compressed air circuit with compressed air;
wherein between the supplying of the first compressed air circuit and the supplying of the second compressed air circuit, the program code segments:
(a) regenerate the air dryer with compressed air from the first compressed air circuit, when the pressure in the first compressed air circuit has reached the target pressure value, and when a moisture value of the air dryer exceeds a predetermined target moisture value;
(b) terminate the regeneration, when the pressure in the first compressed air circuit has dropped to a predetermined limit pressure value, or the moisture value of the air dryer has reached or dropped below the target moisture value;
(c) supply the first compressed air circuit with compressed air until the first compressed air circuit has reached the predetermined target pressure value;
(d) repeat code segments (a)-(c) when the moisture value of the air dryer is greater than the target moisture value.

9. A compressed air supply device of a commercial vehicle, comprising a non-transitory computer readable medium having stored therein program segments that:
supply the first compressed air circuit with compressed air until the pressure in the first compressed air circuit has reached a predetermined target pressure value;
subsequently supply the second compressed air circuit with compressed air;
wherein between the supplying of the first compressed air circuit and the supplying of the second compressed air circuit, the program code segments:
(a) regenerate the air dryer with compressed air from the first compressed air circuit, when the pressure in the first compressed air circuit has reached the target pressure value, and when a moisture value of the air dryer exceeds a predetermined target moisture value;
(b) terminate the regeneration, when the pressure in the first compressed air circuit has dropped to a predetermined limit pressure value, or the moisture value of the air dryer has reached or dropped below the target moisture value;
(c) supply the first compressed air circuit with compressed air until the first compressed air circuit has reached the predetermined target pressure value;
(d) repeat code segments (a)-(c) when the moisture value of the air dryer is greater than the target moisture value.

10. A method for regenerating a compressed air supply device of a commercial vehicle, wherein the compressed air supply device has an air dryer, the method comprising the acts of:
(1) supplying a first compressed air circuit with compressed air, wherein the first compressed air circuit is assigned a predetermined maximum pressure value;
(2) regenerating the air dryer with compressed air from the first compressed air circuit, when the pressure in the first compressed air circuit corresponds to at least a predetermined first pressure value, and the moisture level of the air dryer corresponds to at least a predetermined first moisture value;
(3) terminating the regeneration, when the pressure in the first compressed air circuit has dropped to a predetermined second pressure value that is less than the first pressure value, or when the moisture level of the air dryer has dropped to a predetermined second moisture value that is less than the first moisture value;
(4) repeating steps (1) to (3), when the pressure in the first compressed air circuit is less than a target pressure value;
wherein the first pressure value is less than the target pressure value.

11. The method according to claim 10, wherein the method is carried out while filling the compressed air circuit on startup of the commercial vehicle.

12. The method according to claim 10, wherein the second pressure value exceeds a minimum set pressure value of the first compressed air circuit.

13. The method according to claim 10, wherein the first and the second moisture values are below a saturated moisture value of the air dryer.

14. The method according to claim 10, wherein at least one of a modified first pressure value and a modified second pressure value is used during an iterative process.

15. The method according to claim 10, wherein at least one of a modified first moisture value and a modified second moisture value is used during an iterative process.

16. The method according to claim 10, wherein the method is carried out while the commercial vehicle is running.

17. The method according to claim 10, wherein the compressed air supply device is capable of supplying a second compressed air circuit with compressed air, and wherein prior to a step for supplying the second compressed air circuit with compressed air, the method further comprises the acts of:
(5) regenerating the air dryer with compressed air from the first compressed air circuit, when the pressure in the first compressed air circuit has reached the target pressure value, and a moisture value of the air dryer exceeds a predetermined target moisture value;
(6) terminating the regeneration, when the pressure in the first compressed air circuit has dropped to a predetermined limit pressure value or when the moisture value of the air dryer has reached or dropped below the target moisture value;
(7) supplying the first compressed air circuit with compressed air until the first compressed air circuit has reached the predetermined target pressure value;
(8) repeating the (5) to (7), when the moisture value of the air dryer is greater than the target moisture value.

18. The method according to claim 17, wherein the target pressure value is the maximum pressure value.

19. The method according to claim 17, wherein the limit pressure value is greater than a minimum set pressure value of the first compressed air circuit.

20. An electronic control unit for controlling a compressed air supply device of a commercial vehicle, wherein the electronic control unit comprises a non-transitory computer readable medium having stored therein program code segments that:
   (1) supply a first compressed air circuit with compressed air, wherein the first compressed air circuit is assigned a predetermined maximum pressure value;
   (2) regenerate the air dryer with compressed air from the first compressed air circuit, when the pressure in the first compressed air circuit corresponds to at least a predetermined first pressure value, and the moisture level of the air dryer corresponds to at least a predetermined first moisture value;
   (3) terminate the regeneration, when the pressure in the first compressed air circuit has dropped to a predetermined second pressure value that is less than the first pressure value, or when the moisture level of the air dryer has dropped to a predetermined second moisture value that is less than the first moisture value;
   (4) repeat segments (1) to (3), when the pressure in the first compressed air circuit is less than a target pressure value;
   wherein the first pressure value is less than the target pressure value.

* * * * *